United States Patent
Fallah et al.

(10) Patent No.: US 7,210,128 B2
(45) Date of Patent: Apr. 24, 2007

(54) EVENT-DRIVEN OBSERVABILITY ENHANCED COVERAGE ANALYSIS

(75) Inventors: Farzan Fallah, San Jose, CA (US); Indradeep Ghosh, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 10/270,835

(22) Filed: Oct. 14, 2002

(65) Prior Publication Data

US 2004/0073892 A1 Apr. 15, 2004

(51) Int. Cl.
G06F 9/44 (2006.01)
G06F 9/45 (2006.01)
G06F 17/00 (2006.01)
G06F 7/00 (2006.01)

(52) U.S. Cl. ............ 717/135; 717/124; 717/143; 717/154; 707/102; 707/104.1

(58) Field of Classification Search .......... 717/154, 717/155, 156, 157, 135, 144; 707/102; 716/5; 715/787; 712/25; 703/14
See application file for complete search history.

(56) References Cited

U.S. PATENT DOCUMENTS

| | | | | | |
|---|---|---|---|---|---|
| 5,021,947 | A | * | 6/1991 | Campbell et al. | 712/25 |
| 5,481,723 | A | * | 1/1996 | Harris et al. | 717/160 |
| 5,642,514 | A | * | 6/1997 | Peckham | 717/144 |
| 5,649,165 | A | * | 7/1997 | Jain et al. | 716/5 |
| 5,793,369 | A | * | 8/1998 | Atkins et al. | 715/787 |
| 5,970,496 | A | * | 10/1999 | Katzenberger | 707/102 |
| 6,141,635 | A | | 10/2000 | Paul et al. | 703/22 |
| 6,298,317 | B1 | | 10/2001 | Wiemann | 703/22 |
| 6,301,701 | B1 | | 10/2001 | Walker et al. | 717/4 |
| 6,408,321 | B1 | * | 6/2002 | Platt | 708/520 |
| 6,594,783 | B1 | * | 7/2003 | Dollin et al. | 714/38 |
| 6,816,825 | B1 | * | 11/2004 | Ashar et al. | 703/14 |
| 6,820,256 | B2 | * | 11/2004 | Fleehart et al. | 717/155 |
| 2002/0029377 | A1 | | 3/2002 | Pavela | 717/124 |

OTHER PUBLICATIONS

Microsoft Computer Dictionary, Third Edition, published on 1997, p. 437.*
F. Fallah, S. Devadas, and K. Keutzer, "OCCOM: Efficient Computation of Observability-Based Code Coverage Metrics for Functional Verification," Proc. Design Automation Conf., pp. 152-157, Jun. 1998.
J. C. Costa, S. Devadas, and J. C. Monteiro, "Observability Analysis of Embedded Software for Coverage-Directed Validation," Proc. Int. Conf. Computer-Aided Design, pp. 27-32, Nov. 2000.
S. Devadas, A. Ghosh, and K. Keutzer, "An Observability-Based Code Coverage Metric for Functional Simulation," Proc. Int. Conf. Computer-Aided Design, pp. 418-425, Nov. 1996.

(Continued)

*Primary Examiner*—Antony Nguyen-Ba
(74) *Attorney, Agent, or Firm*—Baker Botts L.L.P.

(57) ABSTRACT

A method for event-driven observability enhanced coverage analysis of a program parses a program into variables and data dependencies, wherein the data dependencies comprise assignments and operations. The method builds a data structure having multiple records, with each record having at least one data dependency, a parent node, and a child node. Each node is linked to a variable. The method computes the value of each variable using the data structure. The method performs tag propagation based, at least in part, on the data dependencies and computed values.

22 Claims, 5 Drawing Sheets

OTHER PUBLICATIONS

T. Goradia, "Dynamic Impact Analysis: A Cost-effective Technique to Enforce Error-propagation," Proc. Int'l Symposium on Software Testing and Application, pp. 171-181, Mar. 1993.

J. M. Voas, "*PIE*: A Dynamic Failure-Based Technique," IEEE Trans. on Software Engineering, vol. 18-8, pp. 717-727, Aug. 1992.

F. Fallah and I. Ghosh, "Observability Enhanced Coverage Analysis of C Programs for Functional Validation," IEEE International High Level Design Validation and Test Workshop, 6 pgs, Nov. 2001.

F. Fallah, I. Ghosh and M. Fujita, "A Coverage Metric for Observability-Based Validation of C Programs," International Workshop on Microprocessor Test and Verification, pp. 1-9, Jun. 2002.

I. Ghosh, "Event-Driven Observability Enhanced Coverage Analysis of C Programs for Functional Validation," Asia South Pacific Design Automation Conference, pp. 1-9, Jan. 2003.

\* cited by examiner

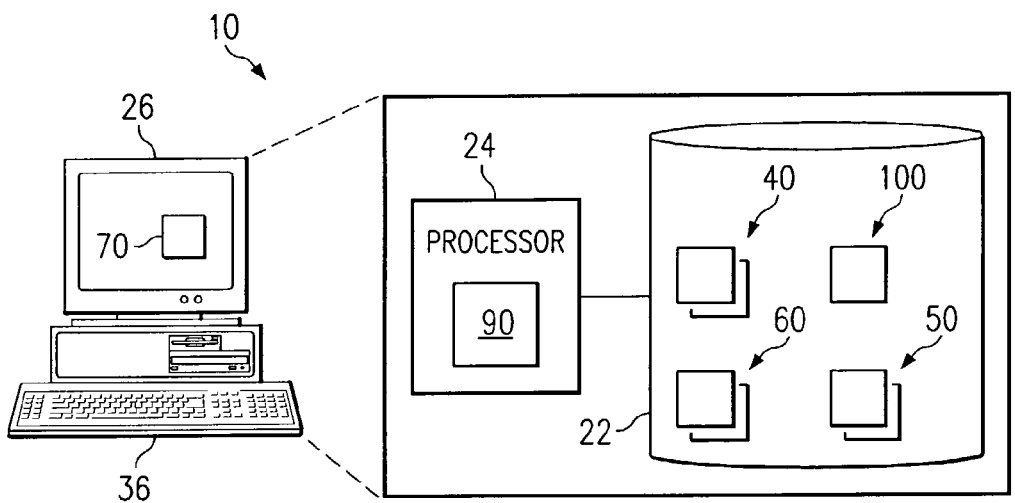
FIG. 1
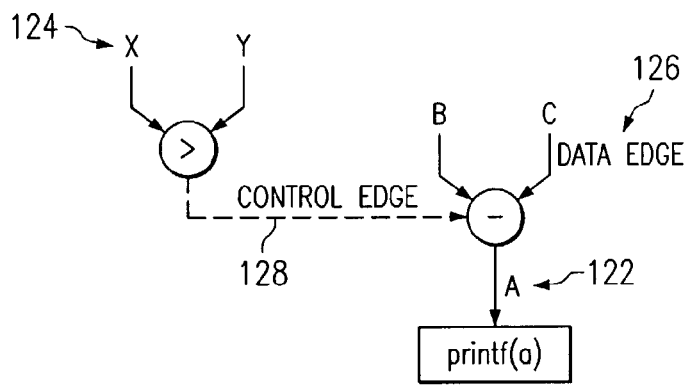
FIG. 2A
FIG. 2B
| CHILD NODE | PARENT NODE | LINE NUMBER | TYPE OF EDGE |
|---|---|---|---|
| B | A | 2 | DATA |
| C | A | 2 | DATA |
| X | A | 1 | CONTROL |
| Y | A | 1 | CONTROL |
FIG. 2C

| | VARIABLE | LINE NUMBER | TAG TYPE | ... |
|---|---|---|---|---|
| 52 | X | 1 | Δ⁺ | ... |
| 52 | A | 2 | ? | ... |
| 52 | Y | 1 | Δ⁻ | ... |
| 52 | B | 2 | Δ' | ... |
| | ⋮ | ⋮ | ⋮ | ⋮ |

*FIG. 2D*

| | PROGRAM | NUMBER OF LINES | NUMBER OF VECTORS | NUMBER OF TAGS | TAG COVERAGE % | ... |
|---|---|---|---|---|---|---|
| 72 | Prog1 | 2288 | 1000 | 4000 | 69 | ... |
| 72 | Prog2 | 4897 | 10000 | 9056 | 31 | ... |
| | ⋮ | ⋮ | ⋮ | ⋮ | ⋮ | ⋮ |

*FIG. 2E*

EVENT-DRIVEN OBSERVABILITY ENHANCED COVERAGE ANALYSIS

TECHNICAL FIELD OF THE INVENTION

This invention relates to computer systems and, more specifically, to event-driven observability enhanced coverage analysis.

BACKGROUND OF THE INVENTION

Software programs are error prone and, therefore, should be validated for correctness. Simulation is an often-used technique for debugging code. But simulation typically leaves large portions of code untested, thereby greatly increasing the chance that bugs remain in the program. To alleviate this problem, various metric methodologies have been proposed that give a percentage of the amount of the description that is exercised by the simulation test vectors. Most of these software coverage metrics consider excitation, but fail to address observation.

SUMMARY OF THE INVENTION

According to one aspect of the invention, a method for event-driven observability enhanced coverage analysis of a program parses a program into variables and data dependencies, wherein the data dependencies comprise assignments and operations. The method builds a data structure having multiple records, with each record having at least one data dependency, a parent node, and a child node. Each node is linked to a variable. The method computes the value of each variable using the data structure. The method performs tag propagation based, at least in part, on the data dependencies and computed values.

The invention has several important technical advantages. One advantage of the present invention is the increased accuracy through coverage analysis of operations, expressions, types, type casts, and other data dependencies and through usage of signed and unsigned tags. A further advantage is the reduction of coverage analysis overhead by using an event-driven model.

Other technical advantages of the present invention will be readily apparent to one skilled in the art. Moreover, although specific advantages have been enumerated above, various embodiments of the invention may have none, some or all of these advantages.

BRIEF DESCRIPTION OF THE DRAWINGS

For a more complete understanding of the present invention and its advantages, reference is now made to the following descriptions, taken in conjunction with the accompanying drawings, in which:

FIG. 1 illustrates a computer system for performing event-driven observability enhanced coverage analysis in accordance with various embodiments of the present invention;

FIG. 2A illustrates exemplary code to be processed by the computer system for use during coverage analysis;

FIG. 2B illustrates a control/data flowgraph for use during coverage analysis;

FIG. 2C illustrates the population of a control/data flowgraph data structure by the computer system for use during coverage analysis;

FIG. 2D illustrates the population of a tag table by the computer system for use during coverage analysis;

FIG. 2E illustrates one embodiment of the results of coverage analysis;

DETAILED DESCRIPTION OF EXAMPLE EMBODIMENTS OF THE INVENTION

Figure 3A:
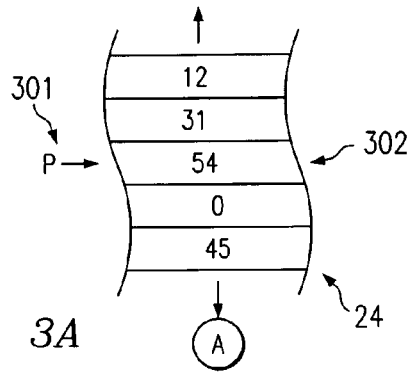
FIGS. 3A–3D illustrate multiple effects of tags on pointers in the computer system for use during coverage analysis.

FIG. 1 illustrates a computing system 10 for event-driven observability enhanced coverage analysis of computer programs. In general, computer 10 may comprise a portion of an information management system that determines if incorrectly computed variables, or bugs, are propagated to the output of a program 100 using a coverage analysis simulation technique called tag propagation. As used in this document, the term "computer" is intended to encompass a personal computer, workstation, network computer, or any other suitable processing device. Computer system 10 may be adapted to execute any operating system including UNIX, Windows or any other operating system.

Computer system 10 includes memory 22, processor 24, display 26, and keyboard 36. The present invention includes programs 100 that may be stored in memory 22 and may be executed by processor 24. FIG. 1 only provides one example of a computer that may be used with the invention. The invention could be used with computers other than general purpose computers as well as computers without conventional operating systems.

Memory 22 may include any memory or database module and may take the form of volatile or non-volatile memory including, without limitation, magnetic media, optical media, random access memory (RAM), read-only memory (ROM), removable media, or any other suitable local or remote memory component. In this embodiment, memory 22 includes flowgraph data structure 40, tag table 50, and variable list data structure 60. Memory 22 may include any other data including, for example, a test vector set. Further, the tables 40, 50, and 60 may be of any suitable format including XML tables, flat files, comma-separated-value (CSV) files, SQL tables, relational database tables, and others. Although FIG. 1 illustrates memory 22 including program 100, it will be understood that program 100 may reside locally in memory 22 or remotely on another computer or server. Program 100 may be any software or logic operable to be parsed into variables and data dependencies. Program 100 may be written in any appropriate computer language such as, for example, C, C++, FORTRAN, COBOL, JAVA, PASCAL, ADA, SMALLTALK, and others.

Processor 24 executes instructions and manipulates data to perform the operations of computer 10. Although FIG. 1 illustrates a single processor 24 in computer 10, multiple processors 24 may be used according to particular needs, and reference to processor 24 is meant to include multiple processors 24 where applicable. In the embodiment illustrated, computer 10 includes a tagging engine 90 that supports analysis of program 100. Tagging engine 90 could include any hardware, software, firmware, or combination thereof operable to process program 100. It will be understood that while tagging engine 90 is illustrated as a single multi-tasked module, the features and functionality performed by this engine may be performed by multiple modules. In one embodiment, tagging engine 90 parses program 100, creates and processes the information included in memory 22, and communicates results 70. It will be understood that while computer 10 illustrates results 70 in display 26, computer 10 may communicate results 70 to another computer through a communications link.

In one aspect of operation, tagging engine 90 parses program 100 into variables and data dependencies. Variables may be any symbol that represents a value in program 100. The data dependencies may include assignments, floating point operations, pointers, recursive functions, expressions, type casting, and any other operation or data modification in program 100. From parsed program 100, tagging engine 90 loads a flowgraph data structure 40, shown in more detail in FIG. 2C, that graphically represents the control structure of program 100. In one embodiment, flowgraph data structure 40 is a graph structure including nodes, representing variables or expressions, and edges, representing data dependencies. For example, tagging engine may create at least one edge for every statement in program 100. Each edge has a parent node and a child node, each representing a variable or an expression. The child node depends on the parent node as defined by the edge.

Tagging engine 90 performs generic simulation to compute the value of each variable in each statement. In one embodiment, tagging engine 90 may use a set of test vectors to perform the simulation. Based at least in part on the variables, data dependencies, and the computed values, tagging engine 90 performs tag propagation on the parsed program 100. In one embodiment, tagging engine 90 performs tag propagation by selecting a first variable, tagging the first variable with a signed tag, and storing the first variable's parent nodes, or dependent variables, in a variable list data structure 60. Variable list data structure 60 may be any data structure that includes a list of variables and is operable to be topologically sorted.

Tagging engine 90 then performs tag propagation on the parent nodes stored in variable list data structure 60. For example, tagging engine 90 may perform tag propagation using the following pseudo-code. It should be understood that the pseudo-code illustrates only a particular embodiment for the process utilized by tagging engine 90. In this example, flowgraph data structure 40 is represented by Graph "G" and variable list data structure 60 is represented by List VARS.

```
Coverage-Analysis (Graph G, List VARS) {
    while (VARS is not empty) {
        Topologically sort VARS;
        V = Remove the first variable in VARS;
        Perform tag simulation for the statement whose
            parent node variable is V, based on G;
        If (tag is propagated to V)
            Insert all variables (nodes in G)
                in the fanout of V into VARS;
    }
}
```

Once tagging engine 90 completes the tag propagation, tagging engine 90 communicates results 70 to the appropriate location. Results 70 may indicate what percentage of the tags are propagated to observable points in program 100. This may increase the accuracy of the program analysis as well decreasing the analysis runtime overhead.

FIG. 2A illustrates a portion of an exemplary program 100 to be processed using the techniques described above. Program 100 includes statements 102 and variables 104. Statements 102 illustrate various data dependencies between the variables 104. In this example, program 100 includes a conditional expression, (X>Y), that creates a data dependency for variable 104 "A". In other words, if variable 104 "X" is larger than variable 104 "Y", then the next statement 102 is executed. The next statement, "A=B−C", subtracts variable 104 "C" from variable 104 "B" and puts the result in variable 104 "A". But if variable 104 "X" is not larger than variable 104 "Y", then variable 104 "A" is not modified.

FIG. 2B illustrates a logical control/data flowgraph (CDFG) 120 that illustrates the logical relationships, or data dependencies, between variables 104 in program 100. Logical CDFG 120 illustrates an example graph of the portion of program 100 illustrated in FIG. 2A. CDFG 120 includes parent node 122, child nodes 124, data edge 126, and control edge 128. Each node 122 or 124 logically represents a variable 104 or an expression in a statement 102. For example, parent node 122 may represent variable "A". Each edge 126 or 128 links two nodes, a parent node 122 and a child node 124, and logically represents a data dependence from statement 104 including the parent node 122 and the child node 124. In this example, parent node 122 "A" has a control dependence, or a control edge 128, from child nodes 124 "X" and "Y". In another example, parent node 122 "A" may have a data dependence, or a data edge 126, from each child nodes 124 "B" and "C".

FIG. 2C illustrates one embodiment of the flowgraph data structure 40 as used by computing system 10 to store and process program 100. Flowgraph data structure 40 is a multi-dimensional data structure that may represent CDFG 120 and includes at least one flowgraph data record 42. Each flowgraph data record 42 includes multiple columns. In this example, flowgraph data record 42 includes columns for a "Child Node" 43, "Parent Node" 44, "Line Number" 45, and "Type of Edge" 46. It will be understood that each flowgraph data record 42 may include none, some, or all of the example columns. In one embodiment, flowgraph data record 42 may include links to other tables. For example, "Child Node" 43 may be used to access particular entries of variable list data structure 60 or to access particular tag records 52 in tag table 50. It should be noted that the flowgraph data record 42 may be accessed by "Child Node" 43, "Parent Node" 44, "Line Number" 45, or any other field. In this embodiment, each record is identified by the combination of "Child Node" 43, "Parent Node" 44, and "Line Number" 45.

The example flowgraph data records 42 shown in flowgraph data structure 40 are a "B,A,2" record, a "C,A,2" record, and a "X,A,1" record and a "Y,A,1" record. The flowgraph data records 42 illustrated in flowgraph data structure 40 are merely exemplary. Computer 10 contemplates any other suitable structure to allow for processing of program 100. Moreover, flowgraph data structure 40 may be separated into multiple tables without departing from the scope of the invention. In one embodiment, flowgraph data structure 40 and tag table 50 are combined into a tag matrix (not shown).

FIG. 2D illustrates one embodiment of the tag table 50 as used by computer system 10 to store and process tags 52. Tag table 50 is a multi-dimensional data structure that includes at least one tag 52. Generally, tag 52 links to variable 104 and represents the possibility that an incorrect value was computed at a particular location. In one embodiment, computer 10 propagates tag 52 to output statements like printf( ) and fprintf( ), which may extend standard coverage metrics to include observability.

Each tag 52 includes multiple columns for holding various information. In this example, tag 52 includes columns for a "Variable" 54, "Line Number" 56, and "Tag Type" 58. It will be understood that each tag 52 may include none, some, or all of the example columns. "Tag Type" 58 categorizes tag 52 as positive ($\Delta^+$), negative ($\Delta^-$), sign ambiguous ($\alpha'$), or unknown (?). A positive tag type indicates a positive error in the value of variable 104 and a negative tag type indicates a negative error in the value of variable 104. Sign ambiguous indicates an error in the value of variable 104, with the sign of the error unknown. Unknown indicates that it is unknown whether the value of variable 104 has an error.

In one embodiment, tag 52 includes a link to another table. For example, values for "Variable" 54 and "Line Number" 56 may be used to access particular entries of flowgraph data structure 40. Values for "Variable" 54 may also link to particular entries of variable list data structure 60.

The example tags 52 shown in tag table 50 are a "X,1" record, a "A,2" record, a "Y,1" record, and a "B,2" record. The tags 52 illustrated in tag table 50 are merely exemplary. Computer 10 contemplates any other suitable device to allow for processing of program 100.

FIG. 2E illustrates exemplary results 70 that indicate what percentage of the tags are propagated to observable points in program 100. In general, tagging engine 90 processes program 100 and communicates results 70 to the appropriate location. In one embodiment, results 70 includes at least one result 72. Generally, result 72 communicates which statements 102 are executed by a particular test set and if those statements 102 have any effect on the output of program 100.

Each result 72 may include multiple columns for illustrating various test results. In this example, result 72 includes columns for a "Program" 73, "Number of Lines" 74, "Number of Vectors" 75, "Number of Tags" 77, and "Percent of Tag Coverage" 78. "Programs" column 73 includes a link to at least one program 100 that was processed by tagging engine 90. In this embodiment, results 70 includes two results 72, "PROG1" and "PROG2". "Number of Lines" 74 illustrates the number of lines in each program 100. "Number of Vectors" 75 illustrates the test set size. "Percent of Tag Coverage" 78 illustrates the tag coverage numbers. "Number of Tags" 77 illustrates the total number of tags 52 injected for each program 100. Therefore, results 70 provides a more accurate measure of the effectiveness of the test set in testing the program 100.

FIGS. 3A–3D illustrate multiple effects of tags 52 on pointers. It will be understood that a pointer 301 is a variable 104 that holds a memory location 302 of another variable 104 in memory. Therefore, if a pointer variable 301 includes an error, any operation using memory location 302 that is indicated by pointer 301 is possibly erroneous. FIGS. 3A–3D utilize the exemplary code statement 102:

*p=20

In this statement 102, "*p" is a pointer 301 that points to memory location 302. The statement attempts to change the value at memory location 302 to "20". But if pointer 301 is erroneous, there are generally two effects: 1) an erroneous memory location 302 is modified; and 2) the intended memory location 302 is not modified. In other words, if there is a tag 52 on pointer 301 variable "p", tags 52 should be propagated to two different variables 104: the one located at the intended memory location 302 and the variable at the erroneous memory location 302.

Referring to FIG. 3A, diagram 300 illustrates example original contents in memory 22. In this example, memory 22 includes "12", "31", "54", "0", and "45" in different locations 302. Pointer 301 "p" points to the memory location 302 that includes the value "54".

Figure 3B:
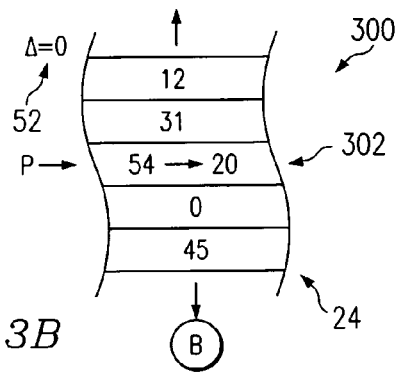

Referring now to FIG. 3B, the statement 102 properly accesses memory location 302 that contains "54" and changes the value to "20". In this example, there is no tag (tag 52 is equal to zero) on pointer 301 "p", so no tags are propagated to any locations 302.

Figure 3C:
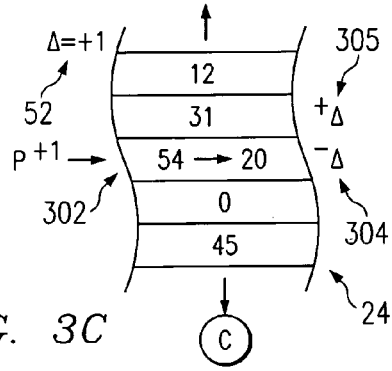

Referring now to FIG. 3C, diagram 300 includes tag 52 with a magnitude of positive one. In this figure, pointer 301 is expected to point to a first memory location 302 that contains "31". But tag 52 modifies the value of pointer 301 to erroneously point to a second unintended memory location 302. In this example, pointer 301 "p" points to the second memory location 302 that is the same magnitude (+1) away from the first memory location 302. Consequently, in this example, the value "54" in memory location 302 is changed to "20". To properly track this, a positive tag 304 is placed on the intended first location 302 and a negative tag 305 is placed on the erroneous second memory location 302.

Figure 3D:
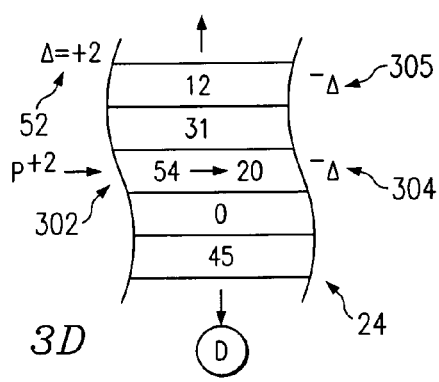

Referring now to FIG. 3D, diagram 300 includes tag 52 with a magnitude of positive two. In this figure, pointer 301 is expected to point to a first memory location 302 that contains "12". But tag 52 modifies the value of pointer 301 to erroneously point to a second unintended memory location 302. In this example, pointer 301 "p" points to the second memory location 302 that is the same magnitude (+2) away from the first memory location 302. Consequently, in this example, the value "54" in memory location 302 is changed to "20". In this example, a negative tag 304 is placed on the intended first location 302 and a negative tag 305 is placed on the erroneous second memory location 302.

Figure 4:
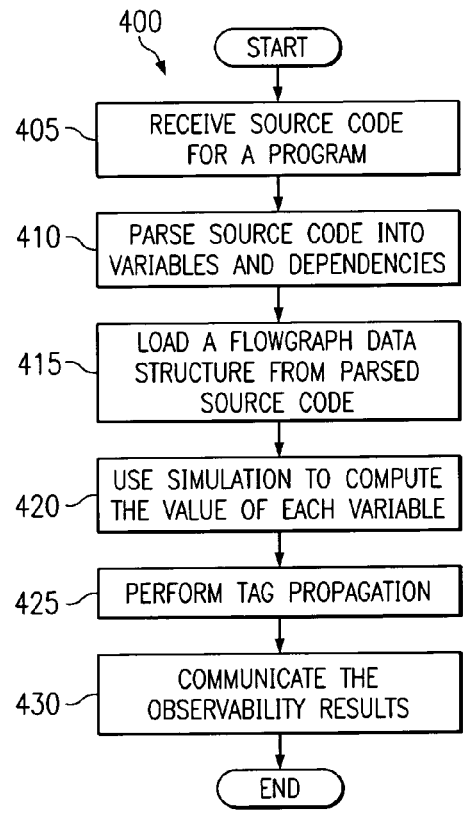
FIG. 4 is a flow diagram illustrating a method for performing event-driven observability enhanced coverage analysis.

FIG. 4A is a flow diagram illustrating a method 400 for performing event-driven observability enhanced coverage analysis. Method 400 is described with respect to computing system 10. However, any other suitable system may use method 400 to perform event-driven observability enhanced coverage analysis without departing from the scope of this disclosure.

Computer 10 receives program 100 at step 405. As described above, program 100 may be any software developed on computer 10, stored locally, and/or communicated to computer 10 from a remote location. Once received, tagging engine 90 parses program 100 into data dependencies and variables 104 at step 410. Parsing program 100 may be performed using any known technique. At step 415, tagging engine 90 loads a flowgraph data structure 40 based on the parsed program 100. It will be understood that tagging engine may first create flowgraph data structure 40 without departing from the scope of this disclosure. Tagging engine 90 uses simulation to calculate the value of each variable 104, using the flowgraph data structure 40, at step 420. At step 425, tagging engine 90 performs tag propagation on program 100. At step 430, tagging engine 90 generates results 70 based on the tag propagation. As described above, tagging engine 90 may communicate results 70 to display 26, memory 22, or any other suitable location. Results 70 aid users in analyzing program 100 by determining whether an erroneous statement has any effect on the output of program 100.

Figure 5A:
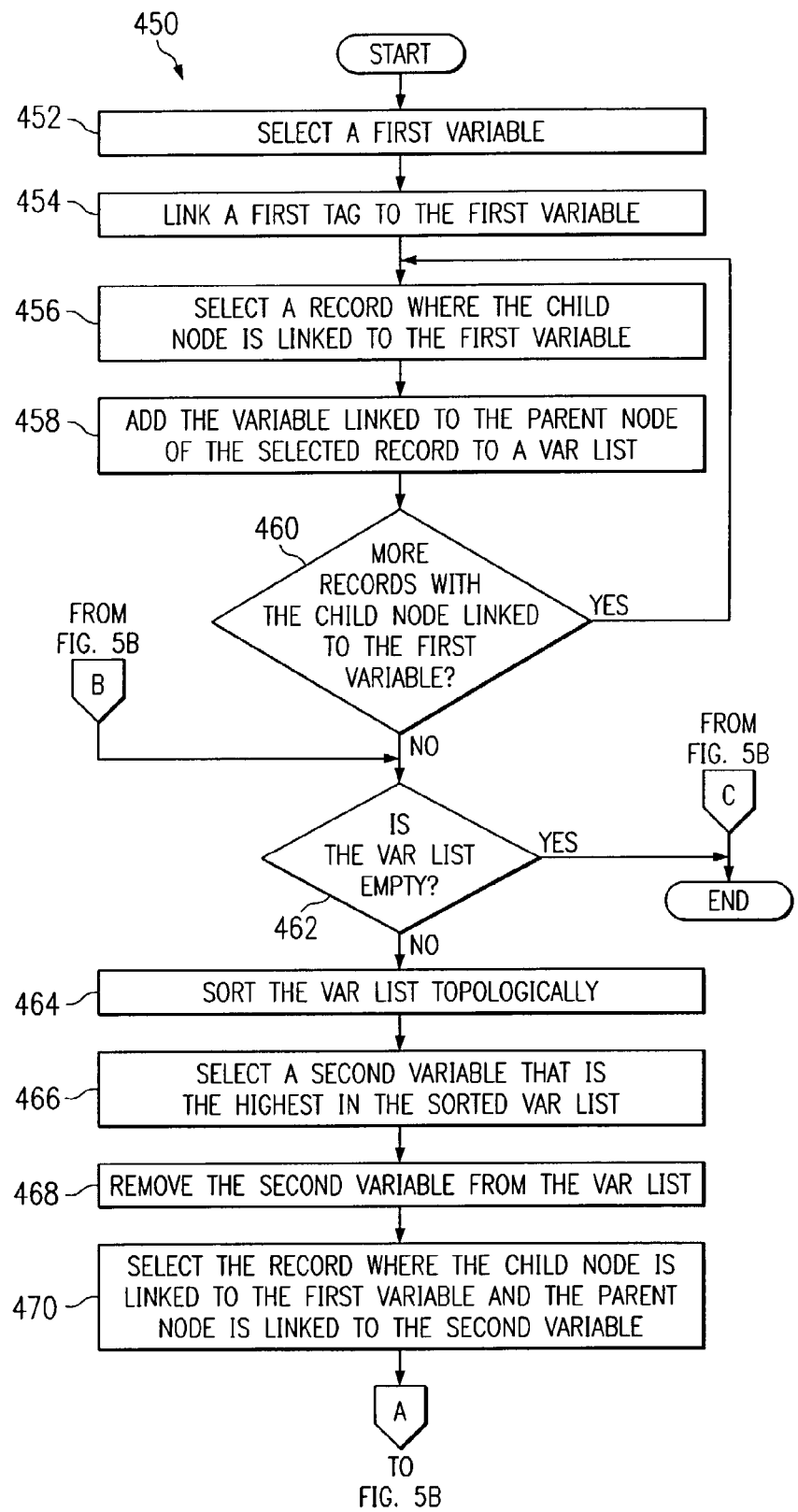
FIGS. 5A–5B illustrate a method for tag propagation for event-driven observability enhanced coverage analysis.
Figure 5B:
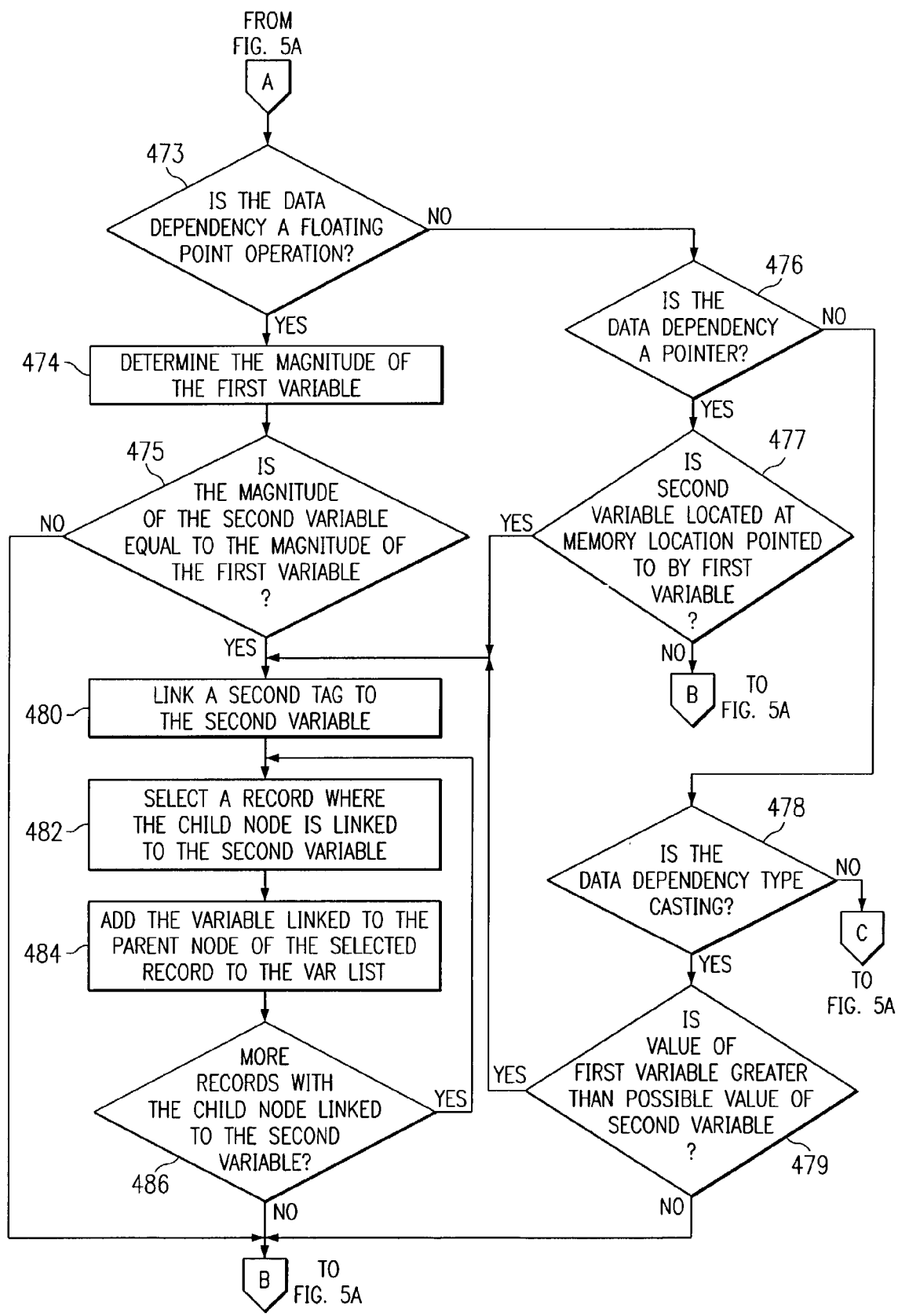

FIG. 5A–5B illustrate a method 450 of tag propagation using the flowgraph data structure 40 populated in method 400. At step 452, tagging engine 90 selects a first variable 104 from flowgraph data structure 40. Tagging engine 90 may use any selection technique, including received input, to select first variable 104. Tagging engine 90 links a first tag 52 to the selected first variable 104, using tag table 50, at step 454. First tag 52 may comprise a positive tag 52, a negative tag 52, or a sign ambiguous tag 52. Tagging engine 90 selects a record 42 where the child node 43 is linked to the tagged first variable 104 at step 456. Next, at step 458, tagging engine 90 adds the variable linked to the parent node 44 in record 42 to variable list data structure 60.

At decisional step 460, tagging engine 90 determines if there are remaining records 42 that have a child node 43 that is linked to the tagged first variable 104. If tagging engine 90 determines that there are remaining records 42, execution returns to step 456. Otherwise execution proceeds to decisional step 462. Tagging engine 90 determines if the variable list data structure 60 is empty. If the variable list data structure 60 is empty, tag propagation is complete. If tagging engine 90 determines that there are variables 104 in variable list data structure 60, then execution proceeds to step 464.

At step 464, tagging engine 90 sorts variable list data structure 60. According to particular embodiment, tagging engine 90 sorts topologically. However, tagging engine 90 may sort variable list data structure 60 using any appropriate technique. At step 466 tagging engine 90 selects a second variable 104, wherein second variable 104 is the highest in the topologically sorted variable list data structure 60. Tagging engine 90 then removes the second variable 104 from variable list data structure 60 at step 408. At step 470, tagging engine 90 selects record 42 where child node 43 is linked to first variable 104 and parent node 44 is linked to second variable 104. Execution proceeds to steps 473–478 where tagging engine 90 performs tag simulation based on the determined data dependency of the two variables 104.

At decisional step 473, tagging engine 90 begins to determine the appropriate tag, if any, for second variable 104 based on the assignment or operation. It should be understood that the following assignments and operations are for example purposes only and that tagging engine 90 may process any appropriate assignment or operation, including addition, subtraction, and others. Returning to the exemplary flowchart, tagging engine 90 first determines if the data dependency is a floating point operation at step 473. Tagging engine 90 determines the magnitude of the first variable 104 at step 474. Tagging engine 90 then determines if the magnitude of second variable 104 is in the same order as the magnitude of first variable 104 at step 475. If the magnitudes are equal, then tagging engine 90 links a second tag 52 to second variable 104, using tag table 50, at step 480. Otherwise tagging engine 90 returns to sorting at step 464.

If tagging engine 90 determines that the data dependency is not a floating point operation at step 473, execution proceeds to step 476. At step 476, if tagging engine 90 determines that the data dependency is a pointer, execution proceeds to decisional step 477. At step 477, tagging engine 90 determines if second variable 104 is located at erroneous memory location 302 indicated by first variable 104. If second variable 104 resides in erroneous memory location 302, then tagging engine 90 links a second tag 52 to second variable 104, using tag table 50, at step 480. Otherwise tag engine 90 returns to sorting at step 464.

If tagging engine 90 determines that the data dependency is not a pointer at step 476, execution proceeds to step 478. At step 478, if the tagging engine 90 determines that the data dependency is type casting, execution proceeds to decisional step 479. At step 479, tagging engine 90 determines if the value of first variable 104 is greater than the maximum, or less than the minimum, possible value of second variable 104 and would cause an overflow. If type casting second variable 104 would cause an overflow, then tagging engine 90 links a second tag 52 to second variable 104, using tag table 50, at step 480. Otherwise tagging engine 90 returns to sorting at step 464.

Once tagging engine 90 performs tag simulation on the second variable in steps 473–480, tagging engine 90 may perform tag simulation on variables linked to the second variable. Thus, at step 482, tagging engine 90 selects a record 42 where child node 43 is linked to tagged second variable 104. Next, at step 484, tagging engine 90 adds variable 104 linked to parent node 44 in record 42 to variable list data structure 60. At decisional step 486, tagging engine 90 determines if there are remaining records 42 that have a child node 43 that is linked to tagged second variable 104. If tagging engine 90 determines that there are remaining records 42, tag engine 90 processes the next record 42 at step 482. Otherwise tag engine 90 returns to sorting at step 464.

The preceding flowchart and accompanying description illustrate only an exemplary method for tagging engine 90 to perform tag propagation. However, computer 10 contemplates tagging engine 90 using any suitable technique for performing these tasks. Thus, many of the steps in this flowchart may take place simultaneously and/or in different orders than as shown. Moreover, tagging engine 90 may use methods with additional steps, fewer steps, and/or different steps, so long as the methods remain appropriate.

Although the present invention has been described in detail, it should be understood that various changes, substitutions and alterations can be made hereto without departing from the sphere and scope of the invention as defined by the appended claims.

What is claimed is:

1. A method for event-driven observability enhanced coverage analysis of a program, comprising:
    parsing a program into variables and data dependencies, wherein the data dependencies comprise assignments and operations;
    loading a data structure based on the parsed program, wherein the data structure comprises a plurality of records and wherein each record comprises at least one of the data dependencies, a parent node, and a child node, wherein each node is linked to one of the variables;
    computing a value of each variable using the data structure; and
    performing tag propagation based, at least in part, on the data dependencies and computed values.

2. The method of claim 1, wherein the data structure comprises a control/data flowgraph data structure and each record further comprises a line number and an edge type.

3. The method of claim 2, wherein the data dependencies further comprise pointers, recursive functions, expressions, and type casting.

4. The method of claim 3, wherein performing tag propagation comprises:
    selecting a first variable from the parsed program;
    linking a tag to the selected first variable;
    selecting a first set of records, wherein the child node of each record is linked to the first variable;
    adding the variable linked to the parent node of each selected record to a variable list;
    topologically sorting the variable list based, at least in part, on the line number;

selecting a second variable from the variable list; and
performing tag simulation on the second variable.

5. The method of claim 4, wherein the selected second variable is the highest in the topologically sorted variable list.

6. The method of claim 4, wherein the tag comprises a line number and a magnitude.

7. The method of claim 6, wherein the tag is selected from a group consisting of the following:
   a positive tag;
   a negative tag; and
   a sign ambiguous tag.

8. The method of claim 7, wherein the tag linked to the first variable comprises a first tag and wherein performing tag simulation on the second variable comprises:
   selecting a first record from the first set of records, wherein the child node is linked to the first variable and the parent node is linked to the second variable;
   determining the existence of a second tag linked to the second variable based, at least in part, on the computed values of the first and second variables, the first tag, and the data dependency from the selected record; and
   in response to the second tag linked to the second variable:
      selecting a second set of records wherein the child node is linked to the second variable; and
      adding the variable linked to the parent node of each selected record in the second set of records to the variable list.

9. The method of claim 8, wherein the data dependency from the selected first record is a floating point operation and determining the existence of the second tag on the second variable comprises:
   determining the magnitude of the first variable; and
   linking the second tag to the second variable in response to the magnitude of the second variable and the magnitude of the first variable being equal.

10. The method of claim 8, wherein the data dependency from the selected first record is a pointer and determining the existence of the second tag linked to the second variable comprises linking the second tag to the second variable in response to the second variable residing in the memory location pointed to by the first variable.

11. The method of claim 1, wherein computing the value of each variable using the data structure comprises using simulation to compute the value of each variable.

12. Logic for event-driven observability enhanced coverage analysis of a program, the logic encoded in media and operable when executed to:
   parse a program into variables and data dependencies, wherein the data dependencies comprise assignments and operations;
   build a data structure, wherein the data structure comprises a plurality of records and wherein each record comprises at least one of the data dependencies, a parent node, and a child node, wherein each node is linked to one of the variables;
   compute a value of each variable using the data structure; and
   perform tag propagation based, at least in part, on the data dependencies and computed values.

13. The logic of claim 12, wherein the data structure comprises a control/data flowgraph data structure and each record further comprises a line number and an edge type.

14. The logic of claim 13, wherein the data dependencies further comprise pointers, recursive functions, expressions, and type casting.

15. The logic of claim 13, wherein the logic operable when executed to perform tag propagation comprises the logic operable when executed to:
   select a first variable from the parsed program;
   link a tag to the selected first variable;
   select a first set of records, wherein the child node of each record is linked to the first variable;
   add the variable linked to the parent node of each selected record to a variable list;
   topologically sort the variable list based, at least in part, on the line number;
   select a second variable from the variable list; and
   perform tag simulation on the second variable.

16. The logic of claim 15, wherein the selected second variable is the highest in the topologically sorted variable list.

17. The logic of claim 15, wherein the tag comprises a line number.

18. The logic of claim 17, wherein the tag is selected from a group consisting of the following:
   a positive tag;
   a negative tag; and
   a sign ambiguous tag.

19. The logic of claim 18, wherein the tag linked to the first variable comprises a first tag and wherein the logic operable when executed to perform tag simulation on the second variable comprises the logic operable when executed to:
   select a first record from the first set of records, wherein the child node is linked to the first variable and the parent node is linked to the second variable;
   determine the existence of a second tag linked to the second variable based, at least in part, on the computed values of the first and second variables, the first tag, and the data dependency from the selected record; and
   in response to the second tag linked to the second variable:
      select a second set of records wherein the child node is linked to the second variable; and
      add the variable linked to the parent node of each selected record in the second set of records to the variable list.

20. The logic of claim 19, wherein the data dependency from the selected first record is a floating point operation and the logic operable when executed, to determine the existence of the second tag on the second variable comprises the logic operable when executed to:
   determine the magnitude of the first variable; and
   link the second tag to the second variable in response to the magnitude of the second variable and the magnitude of the first variable being equal.

21. The logic of claim 19, wherein the data dependency from the selected first record is a pointer and the logic operable when executed to determine the existence of the second tag linked to the second variable comprises the logic operable when executed to link the second tag to the second variable in response to the second variable residing in the memory location pointed to by the first variable.

22. The logic of claim 12, wherein the logic operable when executed to compute the value of each variable using the data structure comprises the logic operable when executed to use simulation to compute the value of each variable.

* * * * *

UNITED STATES PATENT AND TRADEMARK OFFICE
CERTIFICATE OF CORRECTION

PATENT NO. : 7,210,128 B2 Page 1 of 1
APPLICATION NO. : 10/270835
DATED : April 24, 2007
INVENTOR(S) : Farzan Fallah et al.

It is certified that error appears in the above-identified patent and that said Letters Patent is hereby corrected as shown below:

Column 5, Line 7, after "ambiguous" delete "($\alpha'$)" and insert -- ($\Delta'$) --.

Signed and Sealed this

Fourteenth Day of October, 2008

JON W. DUDAS
*Director of the United States Patent and Trademark Office*